US006530041B1

(12) United States Patent
Furusawa et al.

(10) Patent No.: US 6,530,041 B1
(45) Date of Patent: Mar. 4, 2003

(54) TROUBLESHOOTING APPARATUS TROUBLESHOOTING METHOD AND RECORDING MEDIUM RECORDED WITH TROUBLESHOOTING PROGRAM IN NETWORK COMPUTING ENVIRONMENT

(75) Inventors: Toyoaki Furusawa, Kawasaki (JP); Kenichiro Inoue, Ohita (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/409,579

(22) Filed: Sep. 30, 1999

(51) Int. Cl.[7] .................................................. G06F 11/00

(52) U.S. Cl. ........................................... 714/45; 710/18

(58) Field of Search .............................. 714/45, 46, 47, 714/48, 52, 57, 38, 39, 25, 26, 35; 710/18, 48

(56) References Cited

U.S. PATENT DOCUMENTS

| | | | | |
|---|---|---|---|---|
| 5,113,521 A | * | 5/1992 | Mckeen et al. | 395/650 |
| 5,537,539 A | * | 7/1996 | Narihiro | 395/183.14 |
| 5,721,857 A | * | 2/1998 | Glew et al. | 395/401 |
| 5,729,726 A | * | 3/1998 | Levine et al. | 395/580 |
| 5,797,019 A | * | 8/1998 | Levine et al. | 395/735 |
| 6,125,443 A | * | 9/2000 | Takahashi | 712/244 |
| 6,249,886 B1 | * | 6/2001 | Kalkunte | 714/47 |

* cited by examiner

*Primary Examiner*—Nadeem Iqbal
(74) *Attorney, Agent, or Firm*—Greer, Burns & Crain, Ltd.

(57) ABSTRACT

A troubleshooting apparatus, troubleshooting method and recording medium recorded with troubleshooting program, by which a cause of occurrence of exception occurred in a network computing environment can be promptly diagnosed, by bundlingly collecting the occurrence informations concerning the exceptions when the exception occurrence in the application program is detected.

7 Claims, 7 Drawing Sheets

FIG.4

| | HOST<br>TIME POINT (MINUTE:SECOND) | COLLECTING SERVER<br>TIME POINT (MINUTE:SECOND) | |
|---|---|---|---|
| ATE | 10:02 | 9:57 | |
| ATO | 10:03 | 9:58 | |
| | 10:04 | 9:59 | |
| | 10:05 | 10:00 | |
| | 10:06 | 10:01 | BT1 |
| | 10:07 | 10:02 | |
| | 10:08 | 10:03 | |
| AT2 | 10:09 | 10:04 | |

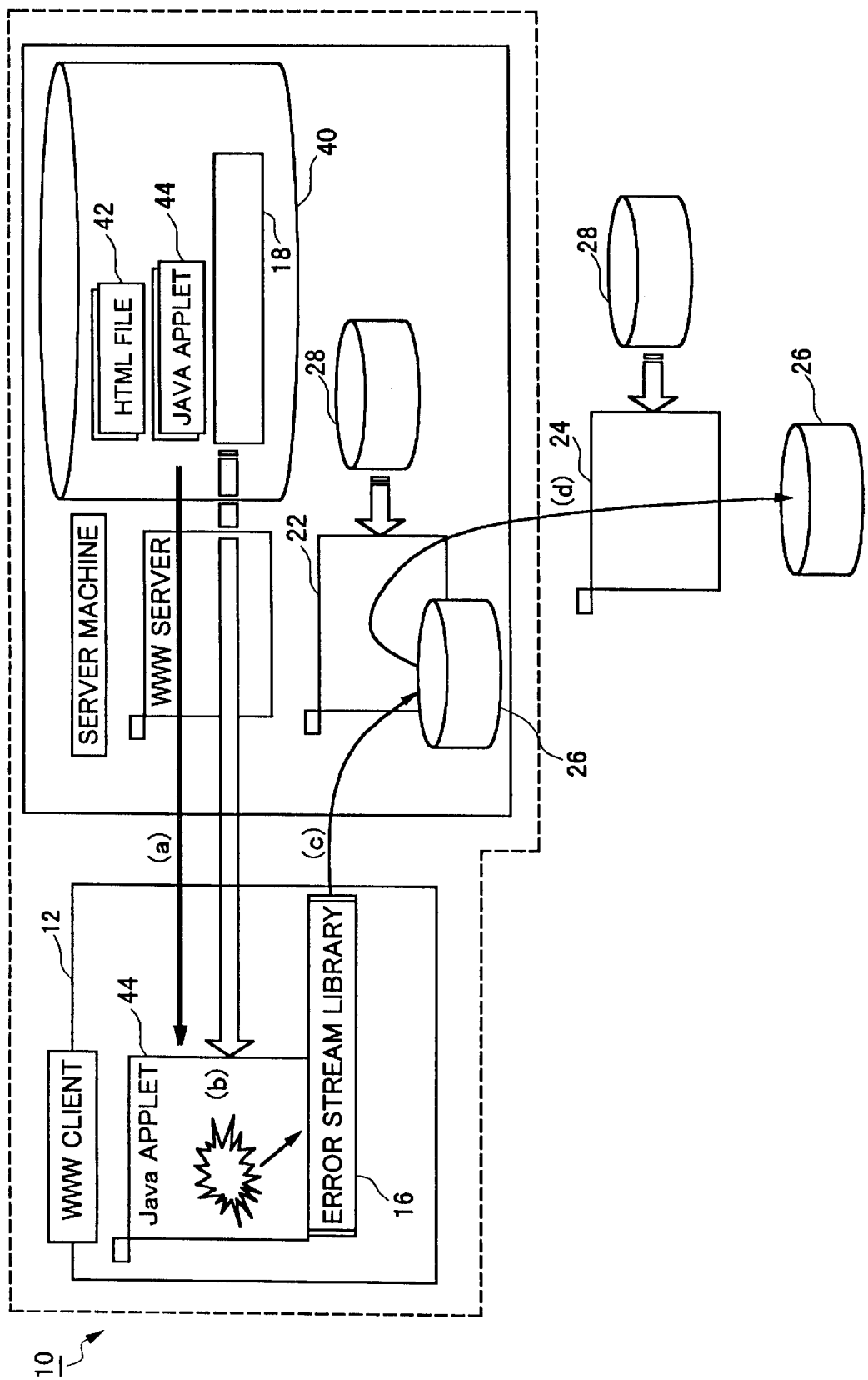

TROUBLESHOOTING APPARATUS TROUBLESHOOTING METHOD AND RECORDING MEDIUM RECORDED WITH TROUBLESHOOTING PROGRAM IN NETWORK COMPUTING ENVIRONMENT

BACKGROUND OF THE INVENTION (1) Field of the Invention

The present invention relates to a troubleshooting technique for quickly diagnosing a cause of occurrence of an exception occurring in a network computing environment constituted of a plurality of computers.

(2) Related Art of the Invention

There has been heretofore constituted a large scale network computing environment, making use of a plurality of computers. Such a network computing environment exemplarily includes a client/server system. Further, in the network computing environment which is expected to be popularized soon, those distributed applications developed by different types of machines, OS's, and languages are linked to one another to conduct a single processing.

Meantime, it is impossible to perfectly prevent an exception from occurring in an application program, in the presently available technique. As such, it is presently typical to record error logs for each application program, and these error logs are analyzed by an expert to diagnose the reason of occurrence of an exception, if any.

However, since the error logs are conventionally specific to respective application programs, there are problems in the network computing environment, as follows:

(1) To specify an application program in which an exception has occurred, it is necessary to examine error logs dispersed in a plurality of computers, thereby requiring great endeavor for exploration.

(2) Error logs are noway recorded with a state such as a communication state at the time the exception has occurred. This forces an expert to presume the state at the time of occurrence of exception, based on those error logs specific to respective application programs, thereby also requiring great endeavor for such investigation.

SUMMARY OF THE INVENTION

The present invention has been carried out in view of the conventional problems as described above, and it is therefore an object of the present invention to provide a troubleshooting technique capable of diagnosing a cause of occurrence of exception, by bundlingly collecting the exceptions that have occurred in a network computing environment.

It is a further object of the present invention to enable those to readily constitute a troubleshooting apparatus, who have obtained a recording medium recorded with a troubleshooting program according to the present invention, by distributing such a medium.

To attain the above object, the present invention provides, as a first solution, a troubleshooting apparatus in a network computing environment, the apparatus comprising: a plurality of application program executing devices by which predetermined application programs are executed, respectively; and an exception information collecting device for collecting occurrence information of an exception occurred in the application programs, wherein the exception information collecting device comprises: an exception information accumulating device for accumulating the occurrence information; an exception occurrence detecting device provided in the application program executing device, so as to detect occurrence of an exception in the application programs; and an exception information transmitting device for transmitting an occurrence information to the exception information accumulating device when occurrence of an exception is detected by the exception occurrence detecting device.

According to such a constitution, when an exception has occurred in an application program constituting the network computing environment, the exception occurrence is detected by the exception occurrence detecting device. Upon detection of the exception occurrence by the exception occurrence detecting device, the exception information is transmitted from the application program executing device to the exception information accumulating device. The thus transmitted exception information is accumulated into the exception information accumulating device. Namely, even in a system where a plurality of cooperative application programs are linked to one another to conduct a single processing, the occurrence informations are not accumulated in the respective application program executing device, but bundlingly collected into the externally attached exception information accumulating device. As such, it is unnecessary to review the occurrence informations of the distributed respective application programs one by one, so that the time and effort for diagnosing the cause of occurrence of exception can be remarkably reduced.

The occurrence information may include: an exception occurrence place information for specifying an application program executing device by which the exception occurring application program has been executed; an exception occurrence time point information for specifying the time point at which the exception has occurred; and an information exchange destination information for specifying the other application program executing device which has conducted information exchange with the application program executing device by which the exception occurring application program has been executed.

According to such a constitution, the occurrence information accumulated in the exception information accumulating device includes the exception occurrence place information, exception occurrence time point information and information exchange destination information. Thus, by analyzing the bundlingly collected occurrence informations, it becomes possible to understand as to, at which application program the exception has occurred, in what communication state the exception has occurred, or when the exception has occurred. Therefore, it becomes unnecessary to analyze each one of the error logs recorded in the respective application program executing device, so that the analysis of exception occurring cause can be readily conducted.

The troubleshooting apparatus may further comprise: a first time point obtaining device for obtaining the respective time points at the plurality of application program executing devices; and a second time point obtaining device for obtaining the unified time point in the network computing environment; wherein the exception occurrence time point information includes the time point obtained by the first time point obtaining device, and the unified time point obtained by the second time point obtaining device.

According to such a constitution, the exception occurrence time point information includes two types of time points, i.e., the exception occurrence time point at the application program executing device and the exception occurrence time point in the network computing environment. As such, even if the time points at the respective application program executing devices are different from one another, the occurrence informations are aligned based on the unified time point in the system, by sorting the occurrence informations by treating the exception occurrence time point in the network computing environment, as a key. Thus, it becomes possible to relate the exception occurrences to one another in time series, thereby enabling easier analysis of the exception occurring cause.

Further, the second time point obtaining device may comprise: a third time point obtaining device for obtaining the time point at the exception information accumulating device; a time-point return request transmitting device provided in the application program executing device, for transmitting a time-point return request to the exception information accumulating device when exception occurrence is detected by the exception occurrence detecting device; a time-point returning device provided in the exception information accumulating device, for transmitting the time point obtained by the third time point obtaining device to the application program executing device which has transmitted the time-point return request, when the time point returning device has received the time-point return request; a returning time length measuring device for measuring the time length from transmission of the time-point return request up to the time at which the time point is returned; and a unified time point calculating device for calculating the unified time point based on the time point returned by the time-point returning device and the time length measured by the returning time length measuring device.

According to such a constitution, the exception occurrence time point in the network computing environment can be calculated based on: the time length from transmission of the time-point return request up to the time when the time point is returned; and the time point returned in response to the time-point return request. As such, it is unnecessary to newly provide a clock server, for obtaining a unified time point of the system. Thus, the cost for constituting the system is further reduced.

The troubleshooting apparatus may further comprise: an information filtering device for filtering the occurrence informations collected by the exception information collecting device, by treating at least the exception occurrence place information, the exception occurrence time point information and the information exchange destination information of the occurrence informations, as a key; and an information display device for displaying the occurrence informations filtered by the information filtering device.

According to such a constitution, the occurrence informations collected by the exception information collecting device are automatically filtered by the information filtering device, by treating the exception occurrence place information, exception occurrence time point information and information exchange destination information, as a key. The thus filtered occurrence informations are displayed such that a user can understand by viewing the same. Namely, by appropriately setting the exception occurrence place information, exception occurrence time point information and information exchange destination information before operating the information filtering device, the occurrence informations are automatically filtered and the result is displayed. Thus, the analysis of the exception occurring cause can be automatically conducted.

The present invention provides, as a second solution, a troubleshooting method in a network computing environment, the method comprising: a plurality of application program executing processes by which predetermined application programs are executed, respectively; and an exception information collecting process for collecting occurrence information of an exception occurred in the application programs, wherein the exception information collecting process comprises: an exception information accumulating process for accumulating the occurrence information; an exception occurrence detecting process provided in the application program executing process, so as to detect occurrence of an exception in the application programs; and an exception information transmitting process for transmitting occurrence information to the exception information accumulating process when occurrence of an exception is detected by the exception occurrence detecting process.

According to such a constitution, when an exception has occurred in an application program constituting the network computing environment, the exception occurrence is detected by the exception occurrence detecting process. Upon detection of the exception occurrence by the exception occurrence detecting process, the exception information is transmitted from the application program executing process to the exception information accumulating process. The thus transmitted exception information is accumulated into the exception information accumulating process. Namely, even in a system where a plurality of cooperative application programs are linked to one another to conduct a single processing, the occurrence information is not accumulated in the respective application program executing process, but bundlingly collected into the externally attached exception information accumulating process. As such, it is unnecessary to review the occurrence informations of the distributed respective application programs one by one, so that the time and effort for diagnosing the cause of occurrence of exception can be remarkably reduced.

The present invention provides, as a third solution, a recording medium recorded with a troubleshooting program in a network computing environment, the program being adapted to perform: a plurality of application program executing functions by which predetermined application programs are executed, respectively; and an exception information collecting function for collecting occurrence information of an exception occurred in the application programs, wherein the exception information collecting function comprises: an exception information accumulating function for accumulating the occurrence information; an exception occurrence detecting function provided in the application program executing function, so as to detect occurrence of an exception in the application programs; and an exception information transmitting function for transmitting occurrence information to the exception information accumulating function when occurrence of exception is detected by the exception occurrence detecting function.

It is noted that the term "recording medium" means things which are capable of assuredly recording with various informations and from which the recorded information can be assuredly taken out as required, and concretely, such as paper card (punched card), paper tape, magnetic tape, magnetic disk, magnetic drum, IC card, and CD-ROM are applicable.

According to such a constitution, the recording medium is recorded with the troubleshooting program in the network computing environment for performing the application program executing function and the exception information collecting function. Further, the exception information collecting function is constituted to include the exception information accumulating function, exception occurrence detecting function and exception information transmitting function. Thus, by simply providing a recording medium recorded with the program for performing the respective functions, it becomes possible to render such as a general computer to have the respective functions so that the troubleshooting apparatus according to the present invention can be readily constructed.

Further objects and aspects of the present invention will become more apparent from the following description of the preferred embodiments when read in conjunction with the accompanying drawings.

BRIEF EXPLANATION OF THE DRAWINGS

FIG. 4 is an explanatory view of a calculation principle for a unified time point;

FIG. 5 is a system constitutional view showing another embodiment of the troubleshooting apparatus according to the present invention;

Preferred Embodiment

There will be described hereinafter embodiments according to the present invention, with reference to the accompanying drawings.

Figure 1:
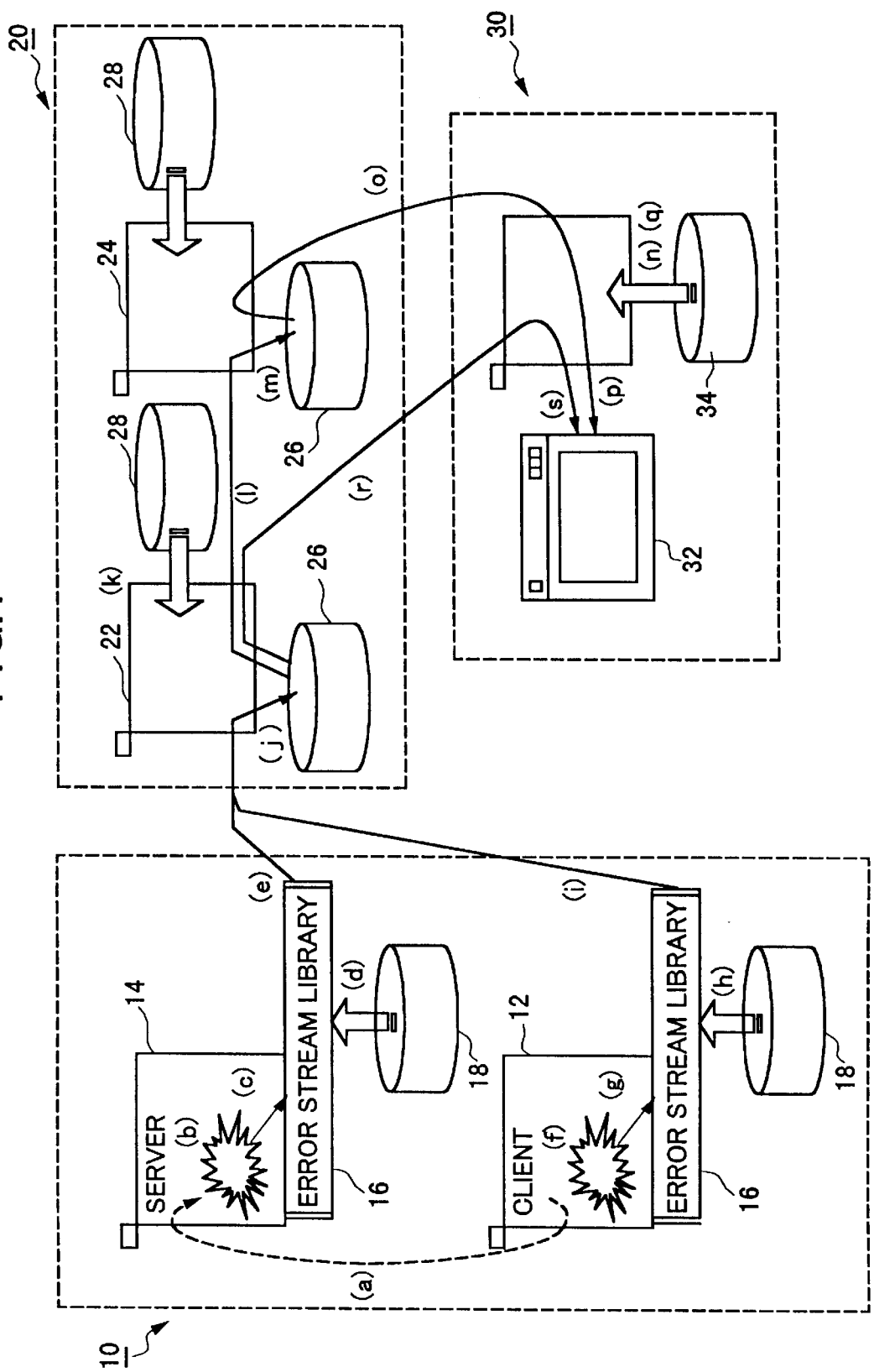
FIG. 1 is a system constitutional view showing an embodiment of a troubleshooting apparatus according to the present invention.

FIG. 1 shows an embodiment in which a troubleshooting apparatus according to the present invention is applied to a single hierarchy of client/server system.

A client/server system 10 (application program executing device, application program executing process, and application program executing function) is constituted to include at least one client 12 and a server 14. The client 12 and the server 14 are connected to each other via communication line (not shown), and information exchange between the client 12 and the server 14 is conducted via such as a socket of TCP/IP (Transmission Control Protocol/Internet Protocol) which is a kind of communication protocol. The client 12 provides an interactive user interface to users of the client/server system 10. The server 14 retrieves such as a database (not shown) in response to a processing request from the client 12, and returns a retrieval result to the client 12. Namely, the client/server system 10 is installed with a program (application program) by which the client 12 and the server 14 cooperatively conduct a predetermined job application.

Further, as a feature of the troubleshooting apparatus according to the present invention, the client/server system 10 is externally attached with a collecting server 20 having a hierarchical structure. This collecting server 20 adopts a single hierarchical structure having only one collecting server, in a relatively small-scale network computing environment constituted of a small number of client/server systems 10. Contrary, there will be adopted a multi-level hierarchical structure including a plurality of collecting servers, in a relatively large scale network computing environment constituted of a large number of client/server systems 10. Note, there is adopted a double level hierarchical structure comprising two collecting servers 22 and 24, in the network computing environment shown in FIG. 1. In the following description, the collecting server 22 of a lower level is called "primary collecting server" and the collecting server 24 of an upper level is called "secondary collecting server", both shown in FIG. 1.

Further connected to the primary collecting server 22 and/or secondary collecting server 24 is a client 30 (hereinafter called "analyzing client") for analyzing an exception.

There are provided communication lines (not shown) between the client 12 or server 14 and the primary collecting server 22, between the primary collecting server 22 and the secondary collecting server 24, and between the primary collecting server 22 and/or secondary collecting server 24 and the analyzing client 30, for mutually connecting them such that information exchange is conducted among them via such as a socket of TCP/IP.

The client 12, server 14, primary collecting server 22, secondary collecting server 24 and analyzing client 30 are constituted by computers at least provided with a central processing unit (CPU) and a memory, respectively, and conduct predetermined job applications based on the programs stored in the memories, respectively. Such programs cooperatively realize exception information collecting device, exception information collecting process, exception information collecting function, exception occurrence detecting device, exception occurrence detecting process, exception occurrence detecting function, second time point obtaining device, time-point return request transmitting device, time point returning device, returning time length measuring device, unified time point calculating device, and information filtering device.

Each of the client 12 and server 14 is provided with an error stream library 16 (exception information transmitting device, exception information transmitting process, and exception information transmitting function) and a property file 18. The error stream library 16 is automatically started when an exception such as program fault has occurred in the client 12 or server 14. The automatically started error stream library 16 transmits an error information to the primary collecting server 22. The property file 18 is then stored with communication details such as address of the primary collecting server 22 being a destination of transmission of the error information and communication port number. Namely, when an exception has occurred in the client 12 or server 14, the error stream library 16 is automatically started, and the error information is transmitted to the primary collecting server 22 in accordance with the communication details stored in the property file 18.

Meanwhile, the primary collecting server 22 for collecting the error information is provided with an error information file 26 (exception information accumulating device, exception information accumulating process, and exception information accumulating function) and a property file 28. The error information file 26 stores the error information transmitted from the client 12 or server 14. The property file 28 stores communication details such as: address of the analyzing client 30 for analyzing the exception occurred in the client 12 or server 14; address of the secondary collecting server 24 as a destination to which the error information is transferred; and a communication port number. The error information to be transferred from the primary collecting server 22 to the secondary collecting server 24 is a basic information which is obtained by excluding a detailed information to be described later, from the error information transmitted from the client 12 or server 14.

The secondary collecting server 24 is provided with an error information file 26 and a property file 28, similarly to the primary collecting server 22. The error information file 26 stores the error information transferred from the primary collecting server 22. The property file 28 stores the communication details such as the address of the analyzing client 30 and the communication port number.

The analyzing client 30 is provided with a monitor 32 (information display device) for displaying the error information, a property file 34, various programs (not shown) for analyzing the exception, and an input device (not shown), such as keyboard, as operation input device. The property file 34 stores communication details such as the addresses of the primary collecting server 22 and secondary collecting server 24, from which the error information is to be acquired, and communication port number.

There will be described hereinafter an operation of the troubleshooting apparatus having such a constitution described above, with reference to FIG. 1.

When a processing request is transmitted from the client 12 to the server 14 (processing (a)) and an exception has occurred in the server 14 (processing (b)), the accompanying error stream library 16 is automatically started to thereby create an error information (processing (c)). There is then determined such as address of destination of transmission for the error information and communication port number based on the communication details stored in the property file 18 (processing (d)), and the error information is transmitted to the primary collecting server 22 (processing (e)).

Meanwhile, in the client 12 which has transmitted the processing request to the server 14, there will occur an exception such as caused by time-out, due to absence of a response for the processing request (processing (f)). Thus, the accompanying error stream library 16 is automatically started to thereby create an error information, in the same manner with occurrence of the exception in the server 14 (processing (g)). There is then determined such as address of destination of transmission for the error information and communication port number based on the communication details stored in the property file 18 (processing (h)), and the error information is transmitted to the primary collecting server 22 (processing (i)).

In the primary collecting server 22 which has received the error information, the received error information is stored into the error information file 26 (processing (j)). There is then determined such as address of destination of transference for the error information and communication port number based on the communication details stored in the property file 28 (processing (k)), and the error information (hereinafter called "basic error information") excluding the detailed information is transferred to the secondary collecting server 24 (processing (l)).

In the secondary collecting server 24 which has received the basic error information, this basic error information is stored into the error information file 26 (processing (m)).

In case of analyzing the error informations collected in the primary collecting server 22 and the secondary collecting server 24, there is conducted error information analysis in the analyzing client 30. Namely, there are determined such as address of the secondary collecting server 24 from which the basic error information is to be acquired, and communication port number, based on the communication details stored in the property file 34 (processing (n)), and the basic error information is acquired from the secondary collecting server 24 via communication line (processing (o)). The acquired basic error information is duly arranged and displayed on the monitor 32 (processing (p)). In case of referring to the detailed error information, there are determined such as address of the primary collecting server 22 from which the detailed error information is to be acquired, and communication port number, based on the communication details stored in the property file 34 (processing (q)), and then the detailed error information is acquired from the primary collecting server 22 (processing (r)). Further, the acquired detailed error information is duly arranged and then displayed on the monitor 32 (processing (s)).

Note, there is adopted a format to be identified by an object oriented "class", for the communication data to be used in the above troubleshooting apparatus.

Figure 2:
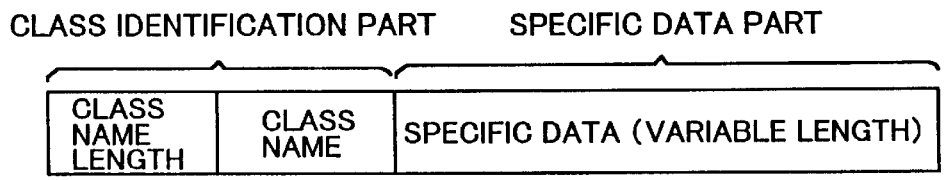
FIG. 2 is an explanatory view of a format of communication data.

As shown in FIG. 2, the communication data itself has a basic format constituted to include a class identification part and a specific data part. The class identification part is settled with a class name length (fixed length) and a class name (variable length) of the class for specifying a type of the communication data. In this way, the class identification part can be described by a minimally required number of bytes irrespectively of the length of the class name, thereby enabling reduction of communication data. The specific data part is settled with a specific data of variable length, corresponding to the class settled in the class identification part. Thus, it becomes possible to determine what is to be processed, based on the class settled in the class identification part when the communication data is received, and to conduct the processing, by referring to the specific data part as required.

Figure 3:
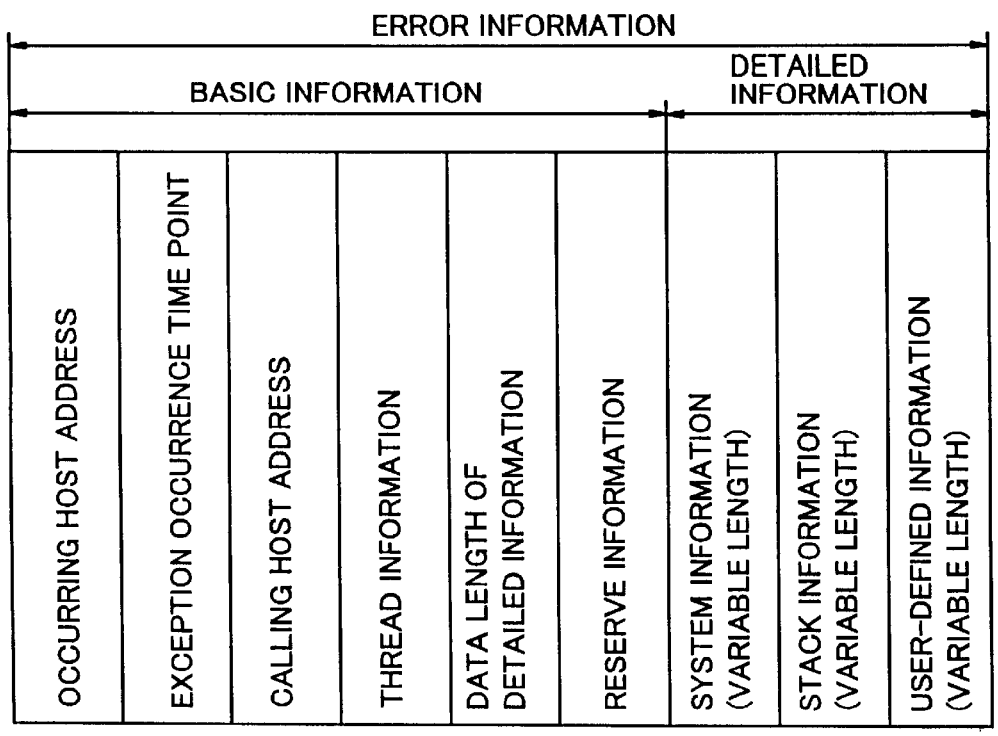
FIG. 3 is an explanatory view of an error information.

As shown in FIG. 3, when the communication data is an error information, the specific data part of the communication data is settled with various informations. The error information is roughly divided into a basic information and a detailed information.

The basic information is constituted to include an occurring host address (exception occurrence place information), an exception occurrence time point (exception occurrence time point information), a calling host address (information exchange destination information), a thread information, a data length of detailed information, and a reserve information. The occurring host address is settled with an address for specifying the client 12 or server 14 (hereinafter called "host") in which the exception has occurred, such as Internet address in case of TCP/IP. The exception occurrence time point is settled with a time point on the host in which the exception has occurred (hereinafter called "host time point"), and a unified time point which is obtained by converting the host time point into the time point on the collecting server 20 by means of the processing to be described later. The host time point is obtained from an internal clock (first time point obtaining device), and the unified time point is obtained by a program for carrying out the processing to be described later. The calling host address is settled with an address for specifying the host, concretely, the client 12 which was calling the host (i.e., server 14) in which the exception occurred, when the exception has occurred. Note, when the exception has occurred in the client 12, there is settled not the calling host address but such as "NULL". The thread information is settled with a thread identifier for specifying the thread at which the exception has occurred, in the host in which the exception has occurred. The data length of detailed information is settled with a data length of the detailed information of variable length. In this embodiment, the reserve information is settled with nothing, but can be settled with information in order to correspond to a future extension.

Meanwhile, the detailed information is constituted to include a system information, a stack information and a user-defined information. The system information is settled such as with hardware information, kind of OS (Operating System), version information of the OS, and account name of a user who has conducted the processing of a job application, all concerning the host at which the exception has occurred. The stack information is settled with a hierarchy information about a function of program in which the exception has occurred, and other function(s) which has/have called the function. The user-defined information is settled with an information which a user can freely define.

There will be described hereinafter how to calculate the unified time point, with reference to FIG. 4.

The reason why the unified time point is to be calculated is that: the time points of the respective hosts and collecting server 20 are not necessarily same with one another, and as such the error informations occurred in the whole system can not be correctly sorted in time series unless the time points, at which the error informations were collected, are unified in advance. Although it may be envisaged to adopt the time point on the collecting server 20 which has received an error information, there will be then caused a time lag since the error information is transmitted via network, resulting in that the occurrence time of an exception is not necessarily unified in the system as a whole.

In the example shown in FIG. 4, the time points on the host and collecting server 20 shall be represented by "minute: second", for simplifying the explanation.

It is now assumed that an exception has occurred in the host, at the time point ATE (10:02) on the host. As described above, the error stream library 16 is automatically started in the host in which the exception has occurred, so as to create an error information. Then, at the time point AT0 (10:03) on the host, there is transmitted a time point notification request from the host toward the collecting server 20 so as to calculate a unified time point (this procedure corresponds to time-point return request transmitting device). The collecting server 20, which has received the time point notification request, promptly returns the time point BT1 (10:01) on this collecting server 20 which has received the time point notification request (this procedure corresponds to the time point returning device). This time point BT1 is acquired by the internal clock (third time point obtaining device) of the collecting server 20. In the host, there is calculated a unified time point at which the exception has occurred, based on the time point AT2 (10:09) on the host which has received the returned time BT1, time point ATE, time point AT0, and time point BT1, in a procedure as described hereinafter.

There is firstly calculated the time point AT1 on the host at which the collecting server 20 is supposed to have received the time point notification request, by the following equation based on the time point AT0 and time point AT2:

$$AT1 = AT0 + (AT2 - AT0)/2 = 10:03 + (10:09 - 10:03)/2 = 10:06.$$

Next, the difference between the time point on the host and that on the collecting server 20 is supposed to be:

$$BT1 - AT1 = 10:01 - 10:06 = -00:05.$$

Thereafter, the unified time point BTEs at issue is calculated, by the following equation:

$$BTEs = ATE + (BT1 - AT1) = 10:02 + (-00:05) = 9:57.$$

It is noted that the processing for subtracting the time point AT0 from the time point AT2 corresponds to the returning time length measuring device, and the processing for calculating the unified time point BTEs corresponds to the unified time point calculating device.

In this way, by converting the time point on the host into the time point on the collecting server 20, it becomes possible to unify the time points with a precision comparable to a clock server, even without such a clock server. Namely, there can be avoided increase in system construction cost by adding a clock server to the system. Further, it becomes possible to sequence or order the exceptions occurred in the network computing environment, since they can be sorted in an ascending or descending order based on the unified time point. Thus, the exploration of cause of exception occurrence can be performed quickly and readily.

There will be described hereinafter a concrete method for performing the troubleshooting apparatus.

There is defined an error stream class "ERCErrorStream", so as to transmit an error information from the error stream library 16 on the host to the collecting server 20. Although the error stream class is described by Java in this embodiment, those languages other than Java such as COBOL, C++ may be used without any problem (the same rule applies correspondingly to the following).

public class ERCErrorStream extends PrintStream
{
    public ERCErrorStream(Exception e);
    public static void pushClientHost(InetAddress hostAddress);
    public static void popClientHost( );
    public void appendVar(String itemName, Serializable obj);
    public void notifyErr( );
}

The constructor and methods of the error stream class have the following functions.

(1) public ERCErrorStream(Exception e);
Function: constructor (which constructs the error stream class)
Argument: e: exception
(2) public static void pushClientHost(InetAddress hostAddress);
Function: To settle a calling host address of the error information.
Argument: hostAddress: host address to be settled.
(3) public static void popClientHost( );
Function: To cancel the calling host address of the error information.
Argument: None.
(4) public void appendVar(String itemName, Serializable obj);
Function: To settle a user-defined information of the error information.
Argument: itemName: name of user-defined data
    obj: entity of user-defined data
(5) public void notifyErr( );
Function: To transmit the error information to the collecting server.
Information to be transmitted includes:
    (a) exception occurrence time point (host time point and unified time point), (b) stack information,
(c) system information,
(d) occurring host address,
(e) calling host address (settled by pushClientHost), and
(f) user-defined information (settled by appendvar).
Argument: None.

The aforementioned error stream class is created when an exception has occurred in respective application programs on hosts, so as to transmit an error information to the collecting server 20, as exemplified by the following program example. It is necessary that the construction processing of the error stream class and the transmission processing of an error information are incorporated into an application program in advance, such as by programmers by respective application programs.

```
public class Example...
{
    public void method( ) {
        String strA; // Corporation Member Name Storing Variable
        String strB; // Resident Address Storing Variable
        // First Actual Example
        try   {
            (Normal processing shall be described here.)
        }
        catch(Exception e) { // Exception has occurred
            ERCErrorStream errStream = new ERCErrorStream(e);
            errStream.notifyErr( );
        }
        // Second Actual Example
        try   {
            (Normal processing shall be described here.)
        }
        catch(Exception e) { // Exception has occurred
            ERCErrorStream errStream = new ERCErrorStream(e);
            errStream.appendVar("Corporation Member Name", strA);
            errStream.appendVar("Resident Address", strB);
            errStream.notifyErr( );
        }
    }
}
```

The catch( ) statement in the above program corresponds to the exception occurrence detecting device, exception occurrence detecting process, and exception occurrence detecting function.

There will be described hereinafter a situation where the client 12 is actualized by a Java applet, with reference to FIG. 5. Like reference numerals used in the above embodiment (see FIG. 1) are used to denote identical elements in FIG. 5, and the explanation thereof shall be omitted.

Meantime, Java applet has such a restriction that it is not allowed to directly access to a resource of a computer on which the Java applet is operating. As such, Java applet is incapable of such as recording an error log or outputting an error information onto a monitor on a computer in which an exception has occurred. To collect error informations even under such a restriction, this embodiment adopts such a constitution that the primary collecting server 22 is constructed on the server 14 of the client/server system 10.

Namely, the server 14 has a database 40 for accumulating therein HTML (Hypertext Markup Language) files 42 which are referred to such as by the client 12 and associated Java applets 44. Upon request of reference to a HTML file 42 from the client 12 to the server 14, the server 14 returns Java applet 44 together with a reference object HTML file 42 toward the client 12 (processing (a)). Thereafter, the Java applet 44 returned to the client 12 will operate in a manner same with those application programs installed in the client 12.

At this time, the Java applet 44 is capable of communicating with only the server 14 which has returned this Java applet 44. Making use of this characteristic, when an exception has occurred in the client 12 (processing (b)), the error information is rendered to be transmitted to the server 14, i.e., to the primary collecting server 22 via this Java applet 44 (processing (c)). The primary collecting server 22 transfers the basic error information to the secondary collecting server 24 (processing (d)), similarly to the above embodiment.

To realize such a constitution, there is defined an applet error stream "ERCAppletErrorStream" class, as follows.
public class ERCAppletErrorStream extends ERCErrorStream
{
    public ERCAppletErrorStream(Applet apl, Exception e);
}

The constructor of the applet error stream class has the following function.
public ERCAppletErrorStream(Applet apl, Exception e);
Function: constructor (which constructs an applet error stream class)
Argument: apl: instance of applet
e: exception.

The applet error stream class inherits the error stream class, so that the usage of the applet error stream class is identical with the above explained usage for the error stream class.

Further, as processing in case of decentralized calling, there will be described hereinafter an embodiment in the circumstances of CORBA which is a standard protocol for decentralized calling in UNIX series.

Namely, in case of constituting a decentralized calling system, it becomes possible to pursue a calling host, by registering a host name of the calling host at a portion which is directly called as a remote method. In case of CORBA circumstances, it is required to transfer the host name of the calling host itself to a CORBA client and a CORBA server, by a Context object or an original procedure (such as passing of argument). The CORBA server is to register the host address duly derived from the transferred host information (host name), making use of a pushClientHost method.

The following is an example of a program in the CORBA circumstances.

```
import   com.fujitsu.jbk.erc;
import   java.net.*;
public class Example( ) extends..... implements....
{
    public void method( ) {
        (Normal processing shall be described here.)
    }
    public void remoteMethod( ) {
        hostName =.....;   // Acquire the host name
                           // by Context object or
                           // an argument.
        InetAddress  hostAddress;
        hostAddress = InetAddress.getByName(hostName);
        ERCErrorStream.pushClientHost(hostAddress);
        try {
            (Normal processing shall be described here.)
        }
        catch(Exception e) { // Occurrence of exception
            ERCErrorStream errStream = new ERCErrorStream(e);
            errStream.notifyErr( );
        }
        ERCErrorStream.popClientHost( );  //Reset calling host
    }
}
```

There will be described hereinafter a method for analyzing error information, to be conducted in the analyzing client 30.

Figure 6A:
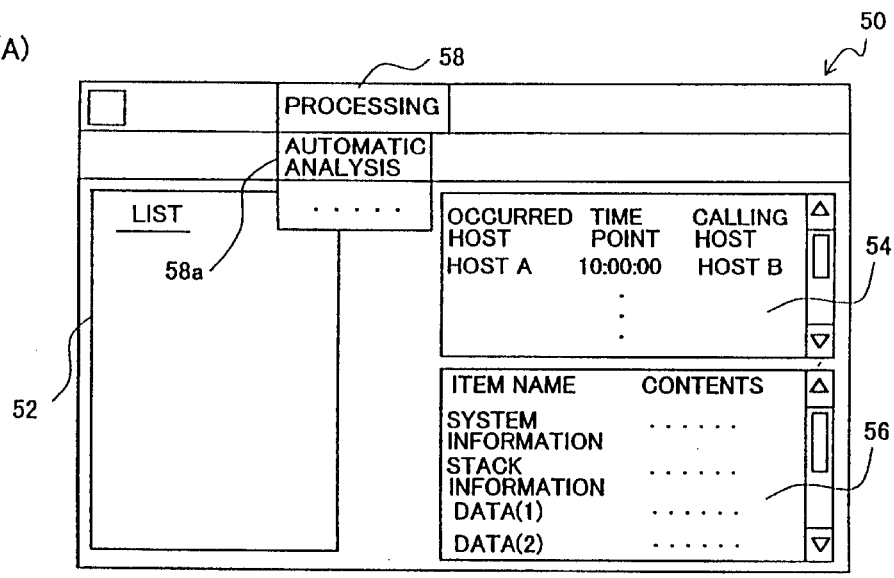
FIG. 6 is a view explaining a procedure for conducting automatic analysis of the error information, in which (A) is an error information display window, (B) is an analysis condition setting window, and (C) is a window showing an analysis result.

When the error information analysis is started in the analyzing client 30, there is displayed an error information display window 50 on the monitor 32, as shown in FIG. 6(A). This error information display window 50 is constituted to include a list display window 52, a basic information display window 54 and a detailed information display window 56. The list display window 52 is displayed with a list of result of automatic analysis about the error information, i.e., those analyzed hosts. It is noted, however, the list display window 52 of FIG. 6(A) is in a state without any of analyzed hosts, since the constitution of the window is just after starting of error information analysis. The basic information display window 54 is displayed with exception occurring host names, exception occurrence time points, and calling host names. Each of the exception occurring host names is acquired from the occurring host address in a pertinent error information, while each of the calling host names is acquired from the calling host address in the same error information. The detailed information display window 56 is displayed with the detailed information of an applicable error information, i.e., system information, stack information and user-defined information.

Figure 6B:
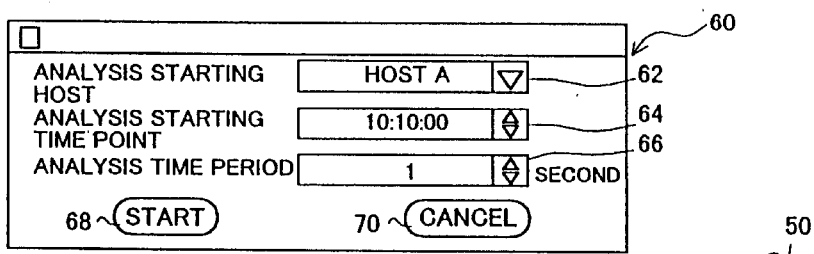

Upon selecting a submenu "Automatic Analysis" 58*a* from a menu "Processing" 58 in the error information display window 50, there is displayed an analysis condition setting window 60 as shown in FIG. 6(B). This analysis condition setting window 60 is constituted to include an analysis starting host setting part 62, an analysis starting time point setting part 64, an analysis time period setting part 66, a "Start" button 68, and a "Cancel" button 70. At the analysis starting host setting part 62, there is settled a host as a starting point from which the error information analysis is started. At the analysis starting time point setting part 64, there is selected, from the error informations sorted by treating the unified time point as a key, a time point from which the error information analysis is started. Namely, only those error informations after the selected analysis starting time are subjected to the analysis. At the analysis time period setting part 66, there is settled a time period during which the analysis is conducted by treating the analysis starting time settled at the analysis starting time point setting part 64 as a starting time. Namely, only those error informations during a settled time period, such as error informations during 5 seconds, are subjected to the analysis. Upon clicking the "Start" button 68, the error information analysis is started under the analysis condition consisting of the settled analysis starting host, analysis starting time point and analysis time period. However, upon clicking the "Cancel" button 70, the settlement of the analysis condition is canceled to return to the error information display window 50 shown in FIG. 6(A). The analysis procedure of the error information will be described later.

Figure 6C:
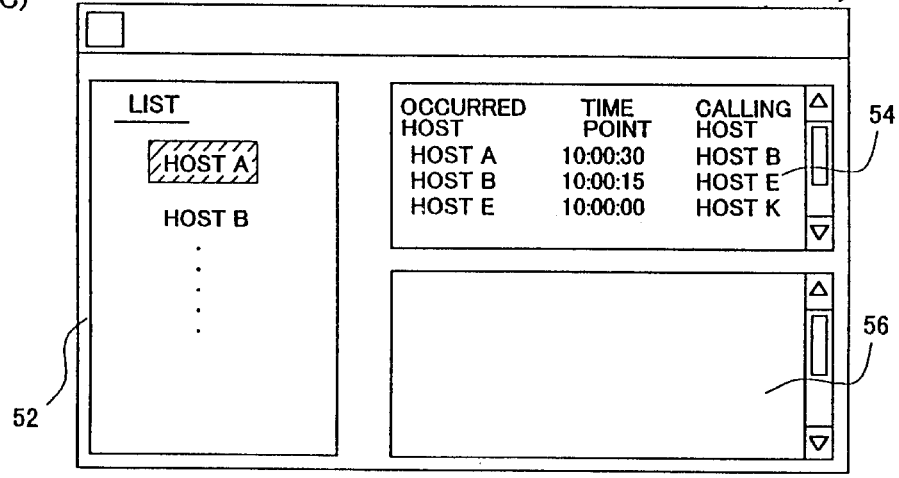

Upon clicking the "Start" button 68 in the analysis condition setting window 60, there is automatically conducted an error information analysis according to the settled analysis condition, so that the analysis result is added into the list display window 52 as shown in FIG. 6(C). Under this condition, such as when the "host A" is selected from the list display window 52, those analysis results concerning the host A are displayed in the basic information display window 54 and the detailed information display window 56, respectively. Those analysis results to be displayed in the basic information display window 54 and detailed information display window 56 are displayed in a sorted state by treating the unified time point as a key, so that the exception analysis can be readily conducted. Namely, by tracing the basic informations displayed in the basic information display window 54 in time series, there is readily specified a host at which the exception has occurred. Further, by reviewing the detailed information in the host at which the exception has occurred, there is readily specified such as a thread in which the exception has occurred.

Figure 7:
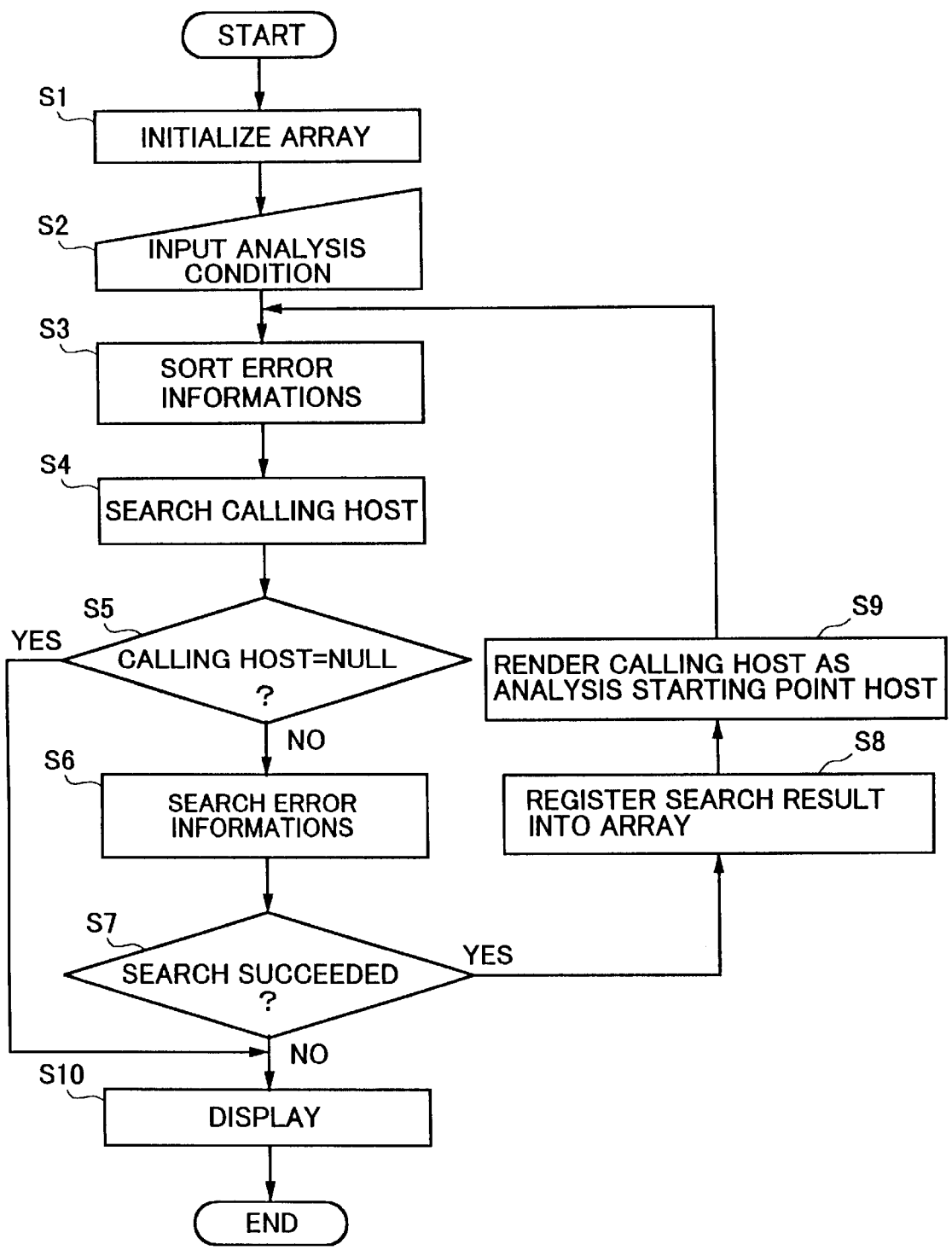
FIG. 7 is a flowchart explaining an automatic analysis processing of the error information.

There will be now described the analysis procedure for an error information, with reference to a flowchart of FIG. 7. Those processings to be described hereinafter realize the information filtering device and the information display device.

At step 1 (in the figure, this is abbreviated to "S1", and the same rule applies correspondingly to the following), there is conducted initialization of an array into which the analysis result of the error informations is registered. Namely, the array is initialized to a state in which the analysis result of the error informations is not registered therein. This array may be constituted on a memory or a file.

At step 2, the analysis condition (analysis starting host, analysis starting time point, and analysis time period) is inputted from the analysis condition setting window 60 shown in FIG. 6(B).

At step 3, those error informations collected in the error information file 26 on the collecting server 20 are sorted in an ascending or descending order by treating the unified time point as a key. Whether sorted in an ascending or descending order may be arbitrarily selected by a user.

At step 4, there is searched for a host (to be called "calling host" hereinafter) which has called an analysis starting point host, by treating the analysis starting host out of the set analysis condition as the analysis starting point host. For example, in case that an exception has occurred when a host A is called from a host B, the calling host is the host B if the host A is settled as the analysis starting point host. On the other hand, if the host B is settled as the analysis starting point host in this case, the calling host is NULL since no hosts calling the host B exist.

At step 5, it is judged whether the calling host is NULL or not, i.e., whether any calling host exists or not. If the calling host is NULL (Yes), it is judged that no calling hosts exist so that the flow goes to step 10. If the calling host is not NULL (No), the flow goes to step 6.

At step 6, there is searched for an error information which satisfies a predetermined searching condition, among those error informations sorted by treating the unified time point as a key. The searching condition is determined based on the analysis starting host, analysis starting time point and analysis time period settled in the analysis condition setting window 60 (see FIG. 6(B)). Namely, there is determined a timewise range of those error informations subject to the analysis, based on the analysis starting time point and analysis time period. Further, among such error informations within the timewise range, there is searched for an error information which is settled with a calling relation of the analysis starting host and the calling host, but the calling relation of which is not registered into the array yet.

At step 7, it is judged whether the search has succeeded or not. The flow goes to step 8 if the search has succeeded (Yes), but to step 10 if the search has failed (No), that is, the search has completed.

At step 8, the search result (concretely, the relation of the analysis starting point host, exception occurrence time point and calling host) is registered into the array.

At step 9, the calling host is rendered to be an analysis starting point host, and the flow goes back to step 4. Namely, in the processings of step 9 and the succeeding steps, the error information analysis is continued by rendering the host, which was treated as the calling host in the former flow loop, to be a new analysis starting point host in this flow loop.

At step 10, those analyzed hosts are displayed on the list display window 52, and those search results registered in the array are displayed on the basic information window 54.

According to the above described processing of steps 1 through 10, only those pertinent error informations are automatically searched for and the search results thereof are displayed on the monitor 32, by simply selecting the starting point host from which the error information analysis is started, and the timewise analysis range. Thus, there is remarkably reduced the time and effort for exploring the exception-occurred host, thereby facilitating the diagnosis of occurring cause of exception such as program fault.

There will be described hereinafter such an error information analysis, by way of a concrete example.

Figure 8:
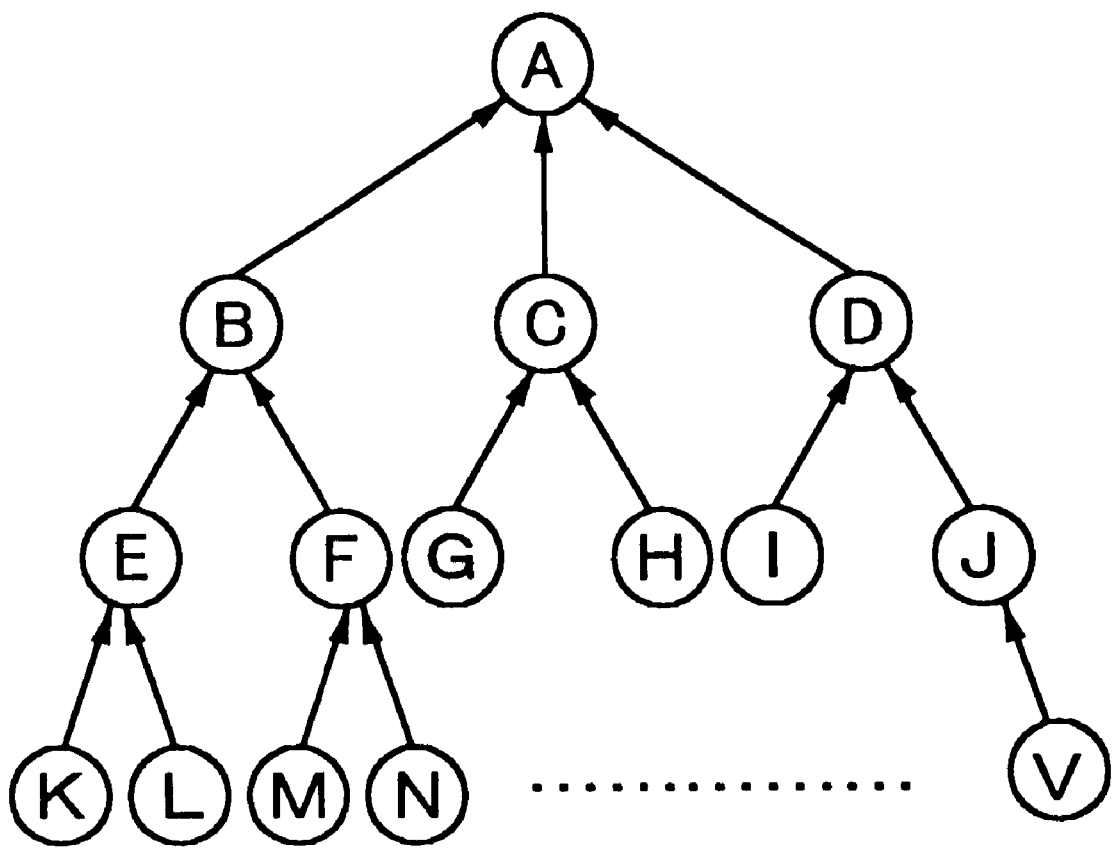
FIG. 8 is a constitutional view of a network computing environment for explaining the automatic analysis of the error information, with a concrete example.

For example, there is now supposed a multi-level hierarchy network computing environment as shown in FIG. 8. This network computing environment is a four-level hierarchy structure including a host A in the highest level, hosts B to D in a level just lower than the host A, hosts E to J in a level just lower than the hosts B to D, and hosts K to V in a level just lower than the hosts E to J. It is further supposed that an exception has occurred when the host K called the host E, and this exception has pervaded up to the time at which the host B calls the host A. In this situation, respective error informations are collected, in the calling relations of host K→ host E→ host B→ host A.

Then, in case of conducting error information analysis, there is selected an analysis starting host for which error analysis is to be conducted, from those error informations displayed in the basic information window 54 of the error information display window 50. In the aforementioned calling relation, the host A may be selected as the analysis starting host. In such a way, there are extracted those error informations settled with any of calling relations of host K → host E, host E→ host B, and host B→ host A, by the aforementioned flowchart processing. By reviewing the extracted error informations, it can be understood at a glance that the exception has occurred in the host K. Thus, the error information analysis can be conducted in an extremely easy manner.

When the detailed information of any of the analyzed error informations is further referred to, there is selected the pertinent basic information for such a detailed information, from those basic informations displayed in the basic information window 54. Then, the detailed information of the selected error information is displayed in the detailed information display window 56.

To display the user-defined information in the detailed information, there is prepared a plug-in function for displaying the user-defined information on the monitor 32, making use of a user-defined class of Java. In the analyzing client 30, the user-defined information is displayed by such a plug-in function.

The user-defined class of Java to be used by the plug-in function is named a plug-in class. In case that the application program for transmitting the error information is created by referring to the error stream library 16, the programmer of the application program has to create a plug-in class which defines a processing for displaying the user-defined information on the monitor 32, and register the plug-in class in the analyzing client 30.

In actually creating a plug-in class, the following plug-in interface "ERCPlugin" is implemented.

```
package     com.fujitsu.jbk.erc;
import   java.lang.*;
import   java.io.*;
import   java.awt.*;
public   interface   ERCPlugin
{
    public   void   setProperty(OjectInputStream in);
    public   Frame   createFrame( );
}
```

The methods of the plug-in interface has the following functions:
(1) public   void   setProperty(java.io.ObjectInputStream in);
Function: To reconstruct a user-defined information from a stream of argument.
Argument: in: stream which stores a variable.
(2) public   java.awt.Frame   createFrame( );
Function: To create a frame for displaying the reconstructed user-defined information.
Argument: None.
There is shown hereinafter a creation example of such a plug-in.

```
import       java.lang.*;
import       java.io.*;
public   class   SampleClass   implements   Serializable {
    public   String   prop1;
    public   Integer   prop2;
    public   SampleClass(String arg1, Integer arg2) {
        prop1 = arg1;
        prop2 = arg2;
    }
}
```

The following is a definition example of a plug-in class for displaying a user-defined information of a SampleClass type.

```
import      java.lang.*;
import      java.io.*;
import      java.awt.*;
public  class  SampleClassPlugin  implements  com.fujitsu.jbk.erc.ERCPlugin
{
    public  SampleClass  data;
    public  void  setProperty(ObjectInputStream in) {
        try     {
            data = (SampleClass)in.readObject( );
        }
        catch(Exception e)  {
            data = null;
        }
    }
    public  Frame  createFrame( )  {
        Frame    frame = new Frame( );
        Frame.setLayout(new FlowLayout( ));
        Label  label;
        label = new Label("prop1:"+data.prop1);
        frame.add(label);
        label = new Label("prop2:"+data.prop2.toString( ));
        frame.add(label);
        frame.pack( );
        return  frame;
    }
    public  String  getValueString( )  {
        String str = "prop1:"+data.prop1+", prop2:"+data.prop2.toString( );
        return  str;
    }
}
```

By providing a plug-in function defined by Java which does not depend on a machine type, it becomes possible to display a user-defined information making use of the same plug-in function, even in a network computing environment constituted such as by different operating systems.

The troubleshooting program according to the present invention can be distributed, by recording a program for attaining the above described function into a recording medium, such as a paper card (punched card), paper tape, magnetic tape, magnetic disk, magnetic drum, IC card, and CD-ROM. Those who have obtained such a recording medium can readily constitute the above described troubleshooting apparatus.

What we claimed are:

1. A troubleshooting apparatus in a network computing environment, comprising: application executing means by which predetermined application programs are executed, respectively, and exception information collecting means for collecting occurrence information of an exception occurred in said application programs, wherein said exception information collecting means is provided to at least one computer in a network computing environment constructed by a plurality of computers, and said application program executing means is provided to each of the other computers; and wherein said exception information collecting means comprises:

exception information accumulating means for accumulating said occurrence information:

exception occurrence detecting means provided in said application program executing means, so as to detect occurrence of an exception in said application programs; and exception information transmitting means for transmitting an occurrence information to said exception-information accumulating means when occurrence of exception is detected by said exception occurrence detecting means.

2. A troubleshooting apparatus in a network computing environment of claim 1, wherein said occurrence information includes:

an exception occurrence place information for specifying an application program executing means by which the exception occurring application program has been executed;

an exception occurrence time point information for specifying the time point at which the exception has occurred; and an information exchange destination information for specifying the other application program executing means which has conducted information exchange with the application program executing means by which the exception occurring application program has been executed.

3. A troubleshooting apparatus in a network computing environment of claim 2, further comprising:

first time point obtaining means for obtaining the respective time points at said plurality of application program executing means; and second time point obtaining means for obtaining the unified time point in said network computing environment;

wherein said exception occurrence time point information includes the time point obtained by said first time point obtaining means, and the unified time point obtained by said second time point obtaining means.

4. A troubleshooting apparatus in a network computing environment of claim 3, wherein said second time point obtaining means comprises:

third time point obtaining means for obtaining the time point at said exception information accumulating means;

time-point return request transmitting means provided in said application program executing means, for transmitting a time-point return request to said exception information accumulating means when exception occurrence is detected by said exception occurrence detecting means;

time-point returning means provided in said exception information accumulating means, for transmitting the time point obtained by said third time point obtaining means to the application program executing means which has transmitted said time-point return request, when said time point returning means has received said time-point return request;

returning time length measuring means for measuring the time length from transmission of said time-point return request up to the time at which the time point is returned; and unified time point calculating means for calculating said unified time point based on the time point returned by said time-point returning means and the time length measured by said returning time length measuring means.

5. A troubleshooting apparatus in a network computing environment of claim 2, further comprising:

information filtering means for filtering the occurrence informations collected by said exception information collecting means, by treating at least said exception occurrence place information, said exception occurrence time point information and said information exchange destination information of said occurrence informations, as a key; and information display means for displaying the occurrence informations filtered by said information filtering means.

6. A troubleshooting method in a network computing environment, comprising: an application program executing process by which predetermined application programs are executed, respectively; and an exception information collecting process for collecting occurrence information of an exception occurred in said application programs, wherein said exception information collecting process is provided to at least one computer in a network computing environment constructed by a plurality of computers, and said application program executing process is provided to each of the other computers; and wherein said exception information collecting process comprises:

an exception information accumulating process for accumulating said occurrence information;

an exception occurrence detecting process provided in said application program executing process, so as to detect occurrence of an exception in said application programs; and an exception information transmitting process for transmitting occurrence information to said exception information accumulating process when occurrence of exception is detected by said exception occurrence detecting process.

7. A recording medium recorded with a troubleshooting program in a network computing environment, said program being adapted to perform: an application program executing function by which predetermined application programs are executed, respectively; and an exception information collecting function for collecting occurrence information of an exception occurred in said application programs, wherein said exception information collecting function is provided to at least one computer in a network computing environment constructed by a plurality of computers, and said application program executing function is provided to each of the other computers; and wherein said exception information collecting function comprises:

an exception information accumulating function for accumulating said occurrence information;

an exception occurrence detecting function provided in said application program executing function, so as to detect occurrence of an exception in said application programs; and an exception information transmitting function for transmitting occurrence information to said exception information accumulating function when occurrence of exception is detected by said exception occurrence detecting function.

* * * * *